US 12,526,643 B2

(12) United States Patent
Sirotkin et al.

(10) Patent No.: US 12,526,643 B2
(45) Date of Patent: Jan. 13, 2026

(54) SHARED SPECTRUM MONITORING

(71) Applicant: Apple Inc., Cupertino, CA (US)

(72) Inventors: Alexander Sirotkin, Herzliya (IL);
Pavan Nuggehalli, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 356 days.

(21) Appl. No.: 18/121,390

(22) Filed: Mar. 14, 2023

(65) Prior Publication Data

US 2023/0308885 A1    Sep. 28, 2023

Related U.S. Application Data

(60) Provisional application No. 63/323,435, filed on Mar. 24, 2022.

(51) Int. Cl.
*H04W 16/14*     (2009.01)
*H04W 24/08*     (2009.01)

(52) U.S. Cl.
CPC .......... *H04W 16/14* (2013.01); *H04W 24/08* (2013.01)

(58) Field of Classification Search
CPC .............................. H04W 16/14; H04W 24/08
See application file for complete search history.

(56) References Cited

U.S. PATENT DOCUMENTS

| | | | | |
|---|---|---|---|---|
| 2019/0191314 A1* | 6/2019 | Mueck | .................. | H04W 16/06 |
| 2019/0293748 A1* | 9/2019 | Gulati | ..................... | G01S 7/023 |
| 2020/0052803 A1* | 2/2020 | Deenoo | .................. | H04W 48/12 |
| 2020/0396659 A1 | 12/2020 | Ahmavaara et al. | | |
| 2021/0153029 A1* | 5/2021 | Mueck | .................. | H04W 16/14 |
| 2021/0243808 A1* | 8/2021 | Deenoo | ............... | H04W 74/002 |
| 2023/0247440 A1* | 8/2023 | Hannan | ............. | H04W 72/0453 |
| | | | | 370/329 |
| 2024/0040463 A1* | 2/2024 | Haustein | ............... | H04W 36/30 |
| 2024/0260065 A1* | 8/2024 | Monteiro | .............. | H04W 48/16 |
| 2024/0324027 A1* | 9/2024 | Sedin | ...................... | H04W 8/22 |
| 2025/0119800 A1* | 4/2025 | Zhou | ...................... | H04W 48/12 |

FOREIGN PATENT DOCUMENTS

WO    WO 20/205549    10/2020

OTHER PUBLICATIONS

Parvini et al., "A Comprehensive Survey of Spectrum Sharing Schemes from a Standardization and Implementation Perspective," aXiv:2203.11125v1, Cornell University Library, Ithaca, New York, Mar. 21, 2022, pp. 1-46.

* cited by examiner

*Primary Examiner* — Melanie Jagannathan
(74) *Attorney, Agent, or Firm* — Brownstein Hyatt Farber Schreck, LLP

(57) ABSTRACT

A 3rd Generation Partnership Project (3GPP) user equipment (UE) includes a wireless transceiver and a processor. The processor is configured to receive, via the wireless transceiver, a measurement configuration including a measurement object and a reporting configuration. The measurement object identifies at least one shared spectrum resource. The processor is also configured to monitor the at least one shared spectrum resource, via the wireless transceiver, for use by non-3GPP radio technology devices; and transmit, in accord with the reporting configuration and via the wireless transceiver, a report on the use of the at least one shared spectrum resource by non-3GPP radio technology devices.

20 Claims, 6 Drawing Sheets

SHARED SPECTRUM MONITORING

CROSS-REFERENCE TO RELATED APPLICATION

This application is a nonprovisional and claims the benefit under 35 U.S.C. § 119(e) of U.S. Provisional Patent Application No. 63/323,435, filed Mar. 24, 2022, the contents of which are incorporated herein by reference as if fully disclosed herein.

TECHNICAL FIELD

This application relates generally to wireless communication systems, including systems, methods, and apparatus for monitoring a shared spectrum.

BACKGROUND

Wireless mobile communication technology uses various standards and protocols to transmit data between a network device (e.g., a base station) and a wireless communication device. Wireless communication system standards and protocols can include, for example, 3rd Generation Partnership Project (3GPP) long term evolution (LTE) (e.g., 4G), 3GPP new radio (NR) (e.g., 5G), 3GPP 6G, and IEEE 802.11 standard for wireless local area networks (WLAN) (commonly known to industry groups as Wi-Fi®)).

As contemplated by the 3GPP, different wireless communication systems standards and protocols can use various radio access networks (RANs) for communicating between a network device of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the network device and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A network device used by a RAN may correspond to that RAN. One example of an E-UTRAN network device or base station is an Evolved Universal Terrestrial Radio Access Network (E-UTRAN) Node B (also commonly denoted as evolved Node B, enhanced Node B, eNodeB, or eNB). One example of an NG-RAN network device or base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
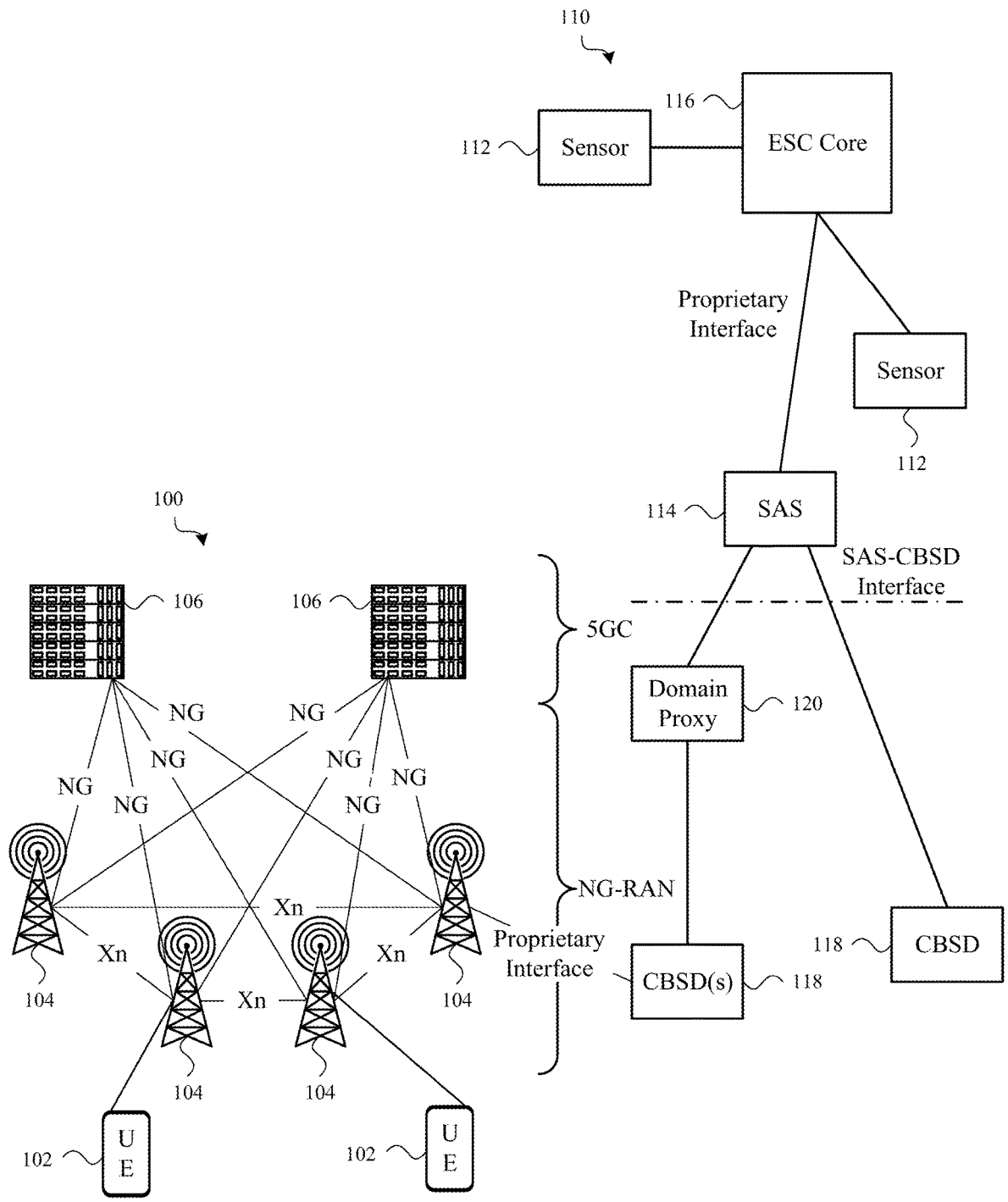
FIG. 1 shows elements of an example 3GPP network and elements of an example Environmental Sensing Capability (ESC) network.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with a network. Therefore, the UE as described herein is used to represent any appropriate electronic device.

As the number of users (both people and machines) that rely on wireless devices increases, and also as the number of uses for wireless communications increases, the need for additional spectrum over which wireless communications can be conducted may increase. Higher frequency ranges of spectrum have been allocated for 5G use (e.g., millimeter wave (mmWave) spectrum) and 6G use (e.g., terahertz (THz) spectrum). However, due to the propagation characteristics of these higher frequency ranges, their use is currently limited to niche scenarios. Also, higher frequency ranges typically require denser deployments of network equipment (e.g., base stations), which can increase the expense of using higher frequency ranges. More spectrum is needed in low and mid frequency ranges, but little or none is available (or, at a minimum, governmental entities (e.g., the Federal Communications Commission (FCC) have already allocated most low and mid frequency ranges for particular users or uses).

One type of spectrum that has a low to mid frequency range is the spectrum allocated for Citizens Broadband Radio Service (CBRS) in the United States. Similar types of spectrum are allocated in other countries. The CBRS provides a wireless communications framework for certain military uses and other uses. The CBRS, like similar services, is operated separately from 3GPP networks, but may allow 3GPP devices to communicate over its spectrum under some circumstances.

Although 3GPP devices may communicate over the spectrum allocated for CBRS Devices (CBSDs), spectrum sharing regulations may require sensing to detect incumbent usage of the spectrum allocated for CBSDs. When incumbent usage is detected, other users (e.g., 3GPP devices and in some cases CBSDs) may need to vacate the spectrum until the incumbent usage ceases. In some cases, the other users may need to vacate the spectrum allocated for CBSDs for a period of time after the incumbent usage ceases. Incumbent usage may include radar use for military, security, or weather monitoring operations.

A dedicated Environmental Sensing Capability (ESC) network can be used to sense incumbent usage of the spectrum allocated for CBRS. A disadvantage of ESC network sensing, however, is the need for "whisper zones." A whisper zone is a zone around an ESC sensor in which use of the spectrum allocated for CBRS is restricted, so as not to interfere with ESC sensors that are listening for radar signals within the spectrum allocated for CBRS. In some cases, the presence of an ESC sensor may block spectrum use in the 3550-3650 MHz frequency range for up to 40 kilometers (km) for Category A devices, and for up to 80 km for Category B devices.

FIG. 1 shows elements of an example 3GPP network 100 and elements of an example ESC network 110.

The 3GPP network 100 may include a set of UEs 102, a RAN (e.g., an NG-RAN), and a core network (e.g., a 5GC). The NG-RAN may include a set of network devices (e.g., network devices of a RAN, or base stations 104, such as eNBs or gNBs). The 5GC may include one or more network devices 106, such as one or more network devices 106 that each provide an Access and Mobility Management Function (AMF). The base stations 104 may send messages to other base stations 104 (e.g., neighbor base stations) over Xn interfaces. The base stations 104 may send messages to the network devices 106, or receive messages from the network devices 106, over NG interfaces. For purposes of this description, and for all of FIGS. 1-6, the term "base station" should be broadly construed to read on any type of network device of a RAN, which network device may be used to facilitate communications with a UE and/or between a UE and a CN.

The ESC network 110 may include a set of ESC sensors 112 that send reports of incumbent usage of the spectrum allocated for CBRS to an ESC core 116. The ESC network may also include a Spectrum Access System (SAS) 114 that allocates resources to one or more CBRS Devices (CBSDs) 118, directly or via a domain proxy 120. CBSDs 118 may in some cases communicate with 3GPP base stations 104 via a proprietary interface, and some UEs 102 may be configured to operate as CBSDs 118.

The ESC sensors 112 may be used to monitor the spectrum allocated for CBRS for incumbent usage. When use of the spectrum allocated for CBRS by an incumbent device is detected, the SAS 114 may send a message to CBSDs 118 in the vicinity of the detected usage, and to the 3GPP network 100, instructing CBSD and/or 3GPP devices to vacate the spectrum. Additionally, CBSDs 118 and 3GPP devices (e.g., the UEs 102 and base stations 104) operating within a fairly large radius of each ESC sensor 112 may be prevented from communicating over the spectrum allocated for CBRS, to preserve whisper zones around the ESC sensors 112.

As described in the present disclosure, UEs 102 and/or base stations 104 of a 3GPP network 100 may be configured to monitor the spectrum allocated for CBRS for incumbent use (e.g., use by non-3GPP radio technology devices). This can eliminate the need for the dedicated ESC network 110 which, in turn, eliminates the need for whisper zones around ESC sensors 112 (e.g., because the 3GPP network 100 can coordinate communications between 3GPP devices to avoid interference with spectrum sensing). In addition, integrating the spectrum sensing into the 3GPP network 100 makes the sensing immune to potential power outages of the ESC network 110 and can provide more sensing redundancy (e.g., because there are many more 3GPP devices that can be enabled to participate in spectrum sensing). Integrating spectrum sensing into the 3GPP network 100 also saves cost in that real estate does not need to be maintained for dedicated ESC sensors 112, and ESC backhaul components do not need to be maintained.

Figure 2:
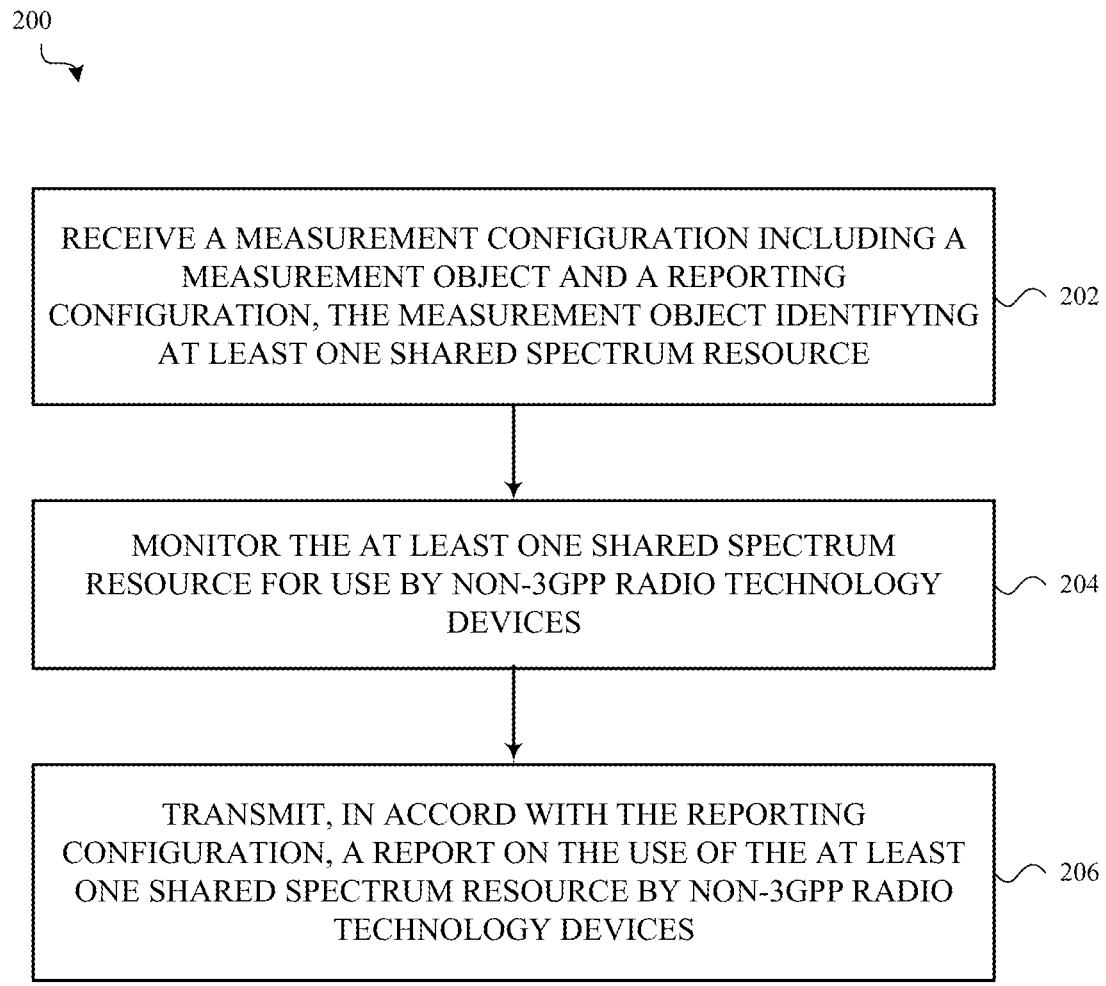
FIG. 2 shows an example method of wireless communication by a 3GPP UE, which method may be used to monitor at least one shared spectrum resource for use by non-3GPP radio technology devices.

FIG. 2 shows an example method 200 of wireless communication by a 3GPP UE, which method 200 may be used to monitor at least one shared spectrum resource for use by non-3GPP radio technology devices (e.g., radar devices). In some embodiments, the method 200 may be performed by a processor of the 3GPP UE. The 3GPP UE may in some cases be a smartphone or other multi-purpose device, and in other cases may be a UE that has a limited set of purposes or is dedicated to monitoring the use of the at least one shared spectrum resource by non-3GPP radio technology devices.

At block 202, the method 200 may include receiving a measurement configuration. The measurement configuration may include a measurement object and a reporting configuration. The measurement object may identify at least one shared spectrum resource. The shared spectrum resource(s) may in some cases include, or be, one or more CBRS resources. The measurement configuration and measurement object may be received via a wireless transceiver of the 3GPP UE, and may be received from a 3GPP base station, or from a core network server via a 3GPP base station.

At block 204, the method 200 may include monitoring the at least one shared spectrum resource for use by non-3GPP radio technology devices (e.g., incumbent devices that are approved to use the shared spectrum, such as radar devices). The monitoring may be performed via the wireless transceiver.

At block 206, the method 200 may include transmitting, in accord with the reporting configuration, a report on the use of the at least one shared spectrum resource by non-3GPP radio technology devices. The report may be transmitted via the wireless transceiver, and in some cases may be transmitted to a network (e.g., to a 3GPP base station of a 3GPP network, or to a core network server via a 3GPP base station).

In some embodiments, the method 200 may be performed as an enhancement of the measurement framework described in 3GPP Technical Specification (TS) 38.331.

In some embodiments of the method 200, the measurement object may be added to the "measObject" information element (IE) described in 3GPP TS 38.331. In some cases, the monitoring of the at least one shared spectrum resource at 204 may include measuring an energy received on the at least one shared spectrum resource (e.g., performing a generic energy measurement). In some cases, the monitoring may include monitoring the at least one shared spectrum resource for a particular non-3GPP radio technology (e.g., performing a dedicated measurement for a particular non-3GPP radio technology, such as monitoring the at least one shared spectrum resource for a radar signal).

In some embodiments of the method 200, the reporting configuration may be added to the "reportConfig" IE described in 3GPP TS 38.331. In some cases, the reporting configuration may specify, or the processor of the 3GPP UE may determine to transmit, a periodic report. In these cases, the method 200 may include transmitting the report on the use of the at least one shared spectrum resource at one or more periodic transmission times. In some cases, the reporting configuration may specify, or the processor of the 3GPP UE may determine to transmit, an event-driven report. In these cases, the method 200 may include determining whether a trigger event is met, and transmitting the report after the trigger event is met. Determining whether the trigger event is met may include, for example, determining whether an energy received on the at least one shared spectrum resource is above a threshold energy level.

The report transmitted at 206 may in some cases include information about the energy received on the at least one shared spectrum resource, information about a non-3GPP radio technology device that is using the at least one shared spectrum resource (e.g., a type of non-3GPP radio technology, such as a radar type, that a non-3GPP radio technology device is transmitting over the at least one shared spectrum resource), and/or other characteristics. In some embodiments, the method 200 may include determining a radar type using the at least one shared spectrum resource, and transmitting, in the report on the use of the at least one shared spectrum resource, an indication of the determined radar type.

The report transmitted at 206 may be transmitted in a connected, idle, or inactive mode of the 3GPP UE. Transmitting the report in a radio resource control (RRC) connected mode (i.e., RRC_CONNECTED mode) may follow the typical reporting procedure, including measurement gaps (if needed). Transmitting the report in an RRC_IDLE mode or an RRC_INACTIVE mode may include following the "early reporting" framework (e.g., measurements performed while in an RRC_IDLE mode or an RRC_INACTIVE mode may be reported to a network (e.g., to a 3GPP base station) when the 3GPP UE transitions to an RRC_CONNECTED mode. Alternatively, a 3GPP UE in an RRC_IDLE mode or an RRC_INACTIVE mode may be configured to proactively establish an RRC connection and transmit the report. In some cases, the RRC connection may be established, and the report transmitted, only when a use of the at least one shared spectrum resource by a non-3GPP radio technology device is detected, or when a use is by a particular type of non-3GPP radio technology device, or when a trigger event such as a threshold energy level is met.

As previously indicated, the report transmitted at 206 may in some cases be transmitted to a 3GPP base station. In other cases, the report may be transmitted to a core network server (e.g., a 5GC) via a 3GPP base station, or to a SAS. The report may be transmitted to a 5GC or SAS when shared spectrum monitoring is controlled primarily by a 5GC or SAS instead of a 3GPP base station. In these latter embodiments, the report may be transmitted in a non-access stratum (NAS) layer in accord with 3GPP TS 24.501. When a report is transmitted in a NAS layer, the report may include the same information as what is defined for UE reporting via radio resource control (RRC) signaling. In some cases, an uplink (UL) NAS transport message can be extended to include the report transmitted at 206.

In some cases, transmitting the report at 206 may reveal information about the location of the 3GPP UE. A user may or may not want information about their location shared. As a result, the method 200 may include a consent requirement. That is, the report may only be transmitted at 206 after the 3GPP UE or a user of the 3GPP UE has consented to transmission of the report. Alternatively, information about the location of the 3GPP UE may only be transmitted with a granularity of location reporting to which the 3GPP UE or its user has consented. In this manner, the privacy of the 3GPP UE and/or its user may be respected. A consent requirement may also assist the network in making good use of UE resources and/or performing network optimizations.

When the method 200 includes a consent requirement, the method 200 may further include determining whether the 3GPP UE or its user (e.g., an end-user or owner) of the 3GPP UE has consented to participate in shared spectrum monitoring. In some embodiments, the determination may be made by checking a file or an indication (e.g., a bit). In some embodiments, the determination may be made by prompting a user of the 3GPP UE to obtain their consent (or denial of consent). In some embodiments, the method 200 may further include transmitting an indication of the 3GPP UE's or user's consent to the network (e.g., to a CN or 3GPP base station of a 3GPP network (e.g., via the wireless transceiver)). In some cases, the report may only be transmitted, at 206, after the 3GPP UE determines the 3GPP UE or its user has consented to transmission of the report, or after the 3GPP UE transmits the consent. In some embodiments, the 3GPP UE may not receive the measurement configuration or reporting configuration, at 202, until after the 3GPP UE or a user of the 3GPP UE has provided a consent to participate in shared spectrum monitoring (and the method 200 may not be performed if the consent is not provided).

In some cases, the consent may be similar to a user consent provided for minimization of drive testing (MDT) for self-organizing network (SON) purposes. The consent may be a general consent to monitor shared spectrum resources, or a consent to monitor shared spectrum resources of a particular type or types, or a consent to perform monitoring/sensing in general. Alternatively, the consent may be a consent to monitor shared spectrum resources but report location information with no more than a predetermined or indicated granularity (e.g., a more precise (or finer) granularity, or a less precise (or coarser) granularity. In some cases, the consent may be obtained by a network operator when the 3GPP UE is purchased, when the 3GPP UE is configured for use, via a website of the network operator, or by other means.

When the 3GPP UE or its user does not provide a consent, the network may not provide the measurement configuration or reporting configuration at 202; or the network may tailor the reporting configuration for a "no consent" or "limited consent" condition (e.g., the network may configure the 3GPP UE to only report a coarse location of the 3GPP UE with the report (e.g., an indication of location that is less granular than a determined location of the 3GPP UE)); or the 3GPP UE may withhold from transmitting an indication of its location with the report (even when configured by the network to do so); or the 3GPP UE may, on its own initiative, transmit only a coarse location of the 3GPP UE with the report.

When the 3GPP UE does transmit a consent, the consent may optionally be associated with a granularity of location reporting (e.g., a granularity of location reporting allowed by the 3GPP UE or its user). In some embodiments, the granularity of location reporting may be a binary indication, indicating fine or coarse granularity of location reporting. For example, a fine granularity of location reporting may be used when a full consent is provided, and a coarse granularity of location reporting may be used when a limited consent is provided. In some embodiments, the granularity of location reporting may indicate one of three or more different granularities of location reporting, and the 3GPP UE or its user may select a permitted granularity of location reporting. In either case, the method 200 may further include identifying a use of the at least one shared spectrum resource by a non-3GPP radio technology device while performing the monitoring, determining a location of the 3GPP UE when the use of the at least one shared spectrum resource by the non-3GPP radio technology device is identified, and determining a granularity of location reporting. The report on the use of the at least one shared spectrum resource may then be transmitted with an indication of the location, with the indication of the location being based on the determined location and the granularity of location reporting. Thus, the indication of the location may be, for example, an indication of the 3GPP UE's location, or an indication that the 3GPP UE is within a particular sector of a cell, an indication that the 3GPP UE is within a particular cell, or an indication that the 3GPP UE is within an area defined by a set of two or more cells, depending on the granularity of location reporting to which the 3GPP UE consents. The granularity of the 3GPP UE's location may therefore be very precise, or in some cases may have a resolution of several kilometers or more. In some embodiments, the reporting configuration received at 202 may include an indication of the granularity of location reporting that should be used by the 3GPP UE (i.e., an indication of the granularity of location reporting to which the 3GPP UE or its user has consented).

In some embodiments in which the 3GPP UE transmits a consent, the method 200 may include identifying a use of the at least one shared spectrum resource by a non-3GPP radio technology device; determining a location of the 3GPP UE when the use of the at least one shared spectrum resource by the non-3GPP radio technology device is identified; determining whether the location differs from a prior location of the 3GPP UE by more than a threshold amount; and transmitting the report with an indication of the location when the location differs from the prior location by more than the threshold amount and otherwise not transmitting the indication of the location with the report. The embodiment described in this paragraph may be useful, for example, to reduce the payload size of the report when the report is transmitted at 206 periodically. In some cases, the network may configure a location change threshold that the 3GPP UE can use when determining when to transmit or omit the indication of the 3GPP UE's location. The network may transmit the location change threshold to the 3GPP UE, and the 3GPP UE may receive and apply the location change threshold.

In some embodiments of the method 200, the method 200 may include transmitting a UE capability to participate in shared spectrum monitoring. The UE capability may be transmitted via the wireless transceiver, and in some cases may be transmitted to a 3GPP base station of a 3GPP network, or to a core network server via a 3GPP base station. The UE capability may be part of a UE radio capability transmitted to a 3GPP base station on an access stratum (AS) layer, or part of a UE network capability transmitted to a 3GPP core network server via a 3GPP base station on a NAS layer. The UE capability to participate in shared spectrum monitoring may be radio band-specific, or may generally apply to all radio bands.

In some embodiments of the method 200, the method 200 may include transmitting UE assistance information to a 3GPP network. The UE assistance information may be transmitted via the wireless transceiver, and in some cases may be transmitted to a 3GPP base station of a 3GPP network, or to a core network server via a 3GPP base station. The UE assistance information may include its preferences for measurement reporting. By way of example, the preferences may include an indication of whether the 3GPP UE prefers not to participate in shared spectrum monitoring for a period of time; a preferred reporting mode for reporting use of shared spectrum (e.g., an event-triggered reporting mode, a periodic reporting mode, or a logged mode in which a report is made upon request); or a preferred periodicity for reporting use of shared spectrum (when the 3GPP UE is configured for periodic reporting).

In some cases, reports on the use of the at least one shared spectrum resource by non-3GPP radio technologies may have a relatively low priority and may not be appropriate for transmission over a (LTE or 5G NR) signaling bearer (SBR) 2 (SBR2). In some cases, the reports may be transmitted over SBR4/x (if a Quality of Experience (QoE) is not used) or SBR5/x (if QoE is used), as configured by a 3GPP network. In some cases, the monitoring of the at least one shared spectrum resource at 204 may include measuring an energy received on the at least one shared spectrum resource (e.g., performing a generic energy measurement). In some cases, the monitoring may include monitoring the at least one shared spectrum resource for a particular non-3GPP radio technology (e.g., performing a dedicated measurement for a particular non-3GPP radio technology, such as monitoring the at least one shared spectrum resource for a radar signal).

Figure 3:
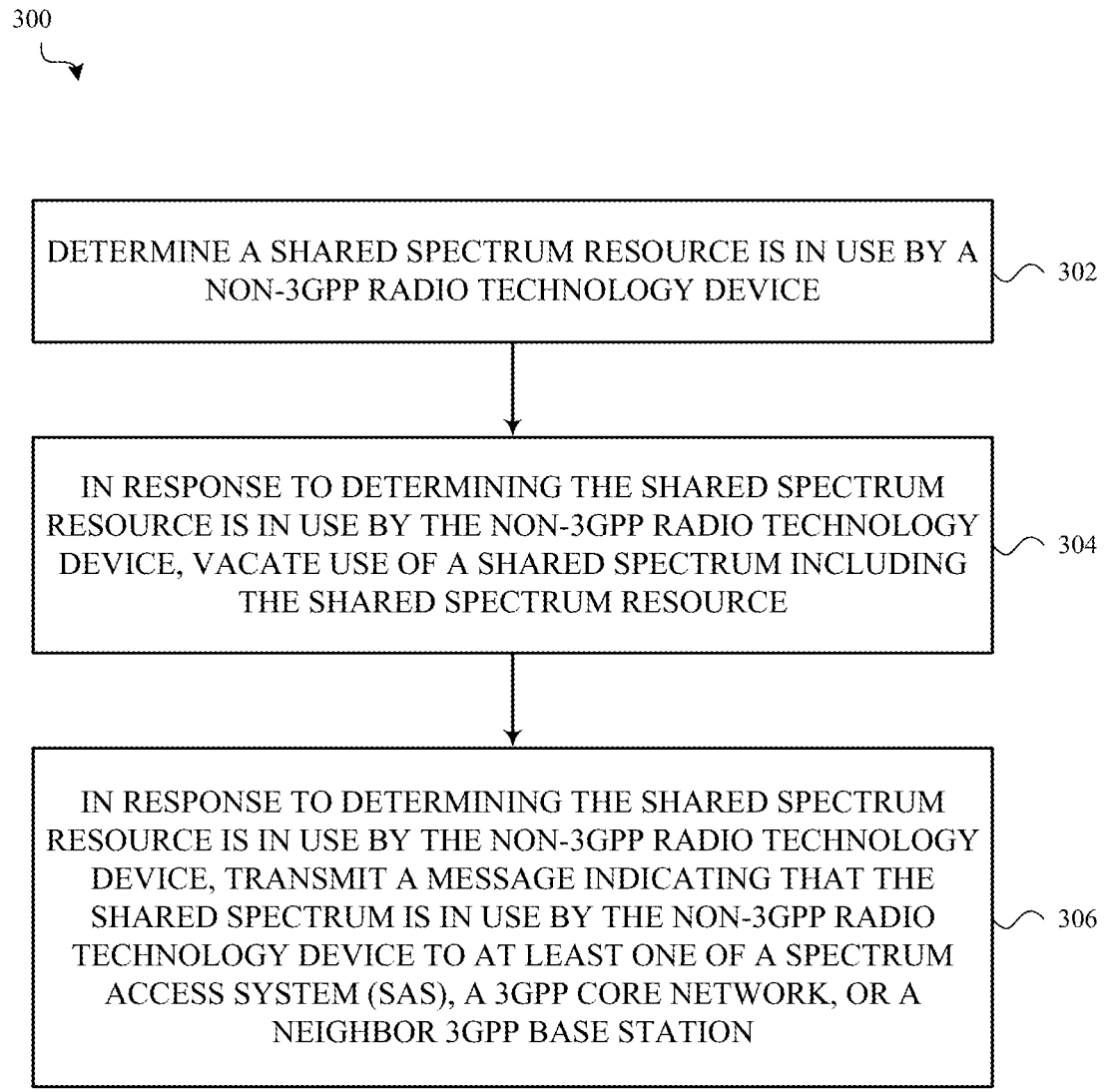
FIG. 3 shows an example method of communication by a network device of a RAN (e.g., a base station), which method may be used to vacate shared spectrum used by non-3GPP radio technology devices.

FIG. 3 shows an example method 300 of wireless communication by a 3GPP base station (e.g., an eNB or gNB), which method 300 may be used to vacate shared spectrum used by non-3GPP radio technology devices (e.g., radar devices). In some embodiments, the method 300 may be performed by a processor of the 3GPP base station.

At block 302, the method 300 may include determining a shared spectrum resource is in use by a non-3GPP radio technology device. The shared spectrum resource may in some cases include, or be, a CBRS resource. The determination may be made by monitoring at least one shared spectrum resource for use by non-3GPP radio technology devices (e.g., incumbent devices that are approved to use the shared spectrum, such as radar devices). In some cases, the monitoring may be performed via a wireless transceiver of the 3GPP base station, In some cases, the monitoring may include measuring an energy received on the at least one shared spectrum resource (e.g., performing a generic energy measurement). In some cases, the monitoring may include monitoring the at least one shared spectrum resource for a particular non-3GPP radio technology (e.g., performing a dedicated measurement for a particular non-3GPP radio technology, such as monitoring the at least one shared spectrum resource for a radar signal).

The determination at 302 may also be made by receiving, from a 3GPP UE or other device, a report on the use of the shared spectrum resource by the non-3GPP radio technology device, and determining the shared spectrum resource is in use by the non-3GPP radio technology device based at least in part on the report. The report may be generated as described with reference to FIG. 2, and the 3GPP base station may configure the UE to transmit the report as described with reference to FIG. 2. The determination at 302 may also be made in response to receiving a message indicating the 3GPP base station should vacate a shared spectrum (i.e., a shared spectrum that includes the shared spectrum resource).

In some embodiments, the 3GPP base station may only configure a 3GPP UE to transmit a report on the use of the shared spectrum resource after determining the 3GPP UE or a user of the 3GPP UE has consented to participate in shared spectrum monitoring. The 3GPP base station may make this determination based on information received from a CN and/or information received from the 3GPP UE. When the 3GPP base station determines that a 3GPP UE or its user has not consented to participate in shared spectrum monitoring, or that the 3GPP UE or its user has provided only limited consent to participate in shared spectrum monitoring, the method 200 may include, for example, A) not configuring the 3GPP UE to monitor the shared spectrum resource and/or configuring the 3GPP UE to not make a report based on any such monitoring, or B) configuring the 3GPP UE to either 1) withhold an indication of a location of the 3GPP UE from the report, or 2) transmit a coarse location of the 3GPP UE with the report, wherein the coarse location is less granular than a determined location of the 3GPP UE (i.e., a location of the 3GPP UE determined by the 3GPP UE).

In a split gNB central unit (gNB-CU) and gNB distributed unit (gNB-DU) architecture, the monitoring or measurements performed at 302 are likely to be performed by one or more gNB-DUs and the FA application protocol (F1AP) may be extended to support such monitoring or measurements. The F1AP protocol may be extended through an enhancement of the existing RESOURCE STATUS UPDATE message, or using a new F1AP message defined for shared spectrum resource monitoring/measurement. Reports provided from a gNB-DU to a gNB-CU may be similar to the reports provided from a UE to a base station, as described with reference to FIG. 2.

At block 304, the method 300 may include, in response to determining the shared spectrum resource is in use by the non-3GPP radio technology device, vacate use of a shared spectrum including the shared spectrum resource. In some embodiments, only the shared spectrum resource may be vacated, but typically a radio band including the shared spectrum resource (or all of the shared spectrum resources monitored at 302) will be vacated.

At block 306, and in response to determining the shared spectrum resource is in use by the non-3GPP radio technology device, the method 300 may include transmitting a message indicating that the shared spectrum is in use by the non-3GPP radio technology device to at least one of an SAS, a 3GPP core network, or a neighbor 3GPP base station. In some embodiments, more than one message may be transmitted. The message(s) may be transmitted via the wireless transceiver.

In some embodiments, a message transmitted at 306 may be transmitted to a 3GPP core network. For example, a message may be transmitted to an AMF of a 3GPP core network. The message may be sent using next generation application protocol (NG-AP) signaling defined for signal spectrum sensing results (see, 3GPP TS 38.413). For example, the message may be sent as an extension of the RAN CONFIGURATION UPDATE NG-AP message, or as a new dedicated NG-AP message from NG-RAN to AMF. The signaled results can be the results of 3GPP UE and/or 3GPP base station monitoring of at least one shared spectrum resource. The AMF may process or forward the received results, and in some cases may forward the raw or processed results to an SAS or an equivalent 3GPP network function. The results forwarded to or from the AMF may include one or more of a frequency used by the non-3GPP radio technology device, a binary use indication (i.e., shared spectrum is or is not in use by a non-3GPP radio technology device), a type of use by the non-3GPP radio technology device (e.g., radar use, or a type of radar use), and/or a measurement of the at least one shared spectrum resource (e.g., a measured energy).

When an AMF receives an indication, from a 3GPP base station, that shared spectrum is in use by a non-3GPP radio technology device, the AMF may notify other 3GPP base stations or other access points of the use and/or instruct other 3GPP base stations or other access points to vacate the shared spectrum. The notification may in some cases include the results received by the AMF, and in some cases may additionally or alternatively include processed results and/or a distilled indication. For example, the AMF may instruct a 3GPP base station or other access point to vacate the shared spectrum. In some embodiments, the AMF CONFIGURATION UPDATE NG-AP message can be extended for the purpose of such a notification. Alternatively, a new dedicated NG-AP message from AMF to NG-RAN can be defined. The message may be transmitted to one or more 3GPP base stations because they are near a location where use of the shared spectrum resource is detected.

In some embodiments, a message transmitted at 306 may be transmitted to a neighbor 3GPP base station, because the neighbor 3GPP base station is near a location where use of the shared spectrum resource is detected. The message may alert the neighbor 3GPP base station of the use and/or instruct the neighbor 3GPP base station to vacate the shared spectrum. Xn application protocol (Xn-AP) signaling may be used for this purpose. The message may be transmitted in response to shared spectrum usage detected by a 3GPP UE and/or a 3GPP base station. The content of the message may in some cases be the same as the content of an NG-AP message. In some embodiments, the RESOURCE STATUS UPDATE Xn-AP message can be extended for the purpose of such a notification. Alternatively, a new dedicated Xn-AP message can be defined.

In an alternative to the method 300, the operations of the method 300 may be performed by a standalone device that is connected to a gNB. The standalone device may be a device that is dedicated to performing shared spectrum resource monitoring, or a device that also performs other functions. The standalone device may be considered part of the structure of a RAN (i.e., a RAN including a gNB), but in some cases may not be a device that is used for 3GPP UE access to a 3GPP network).

Figure 4:
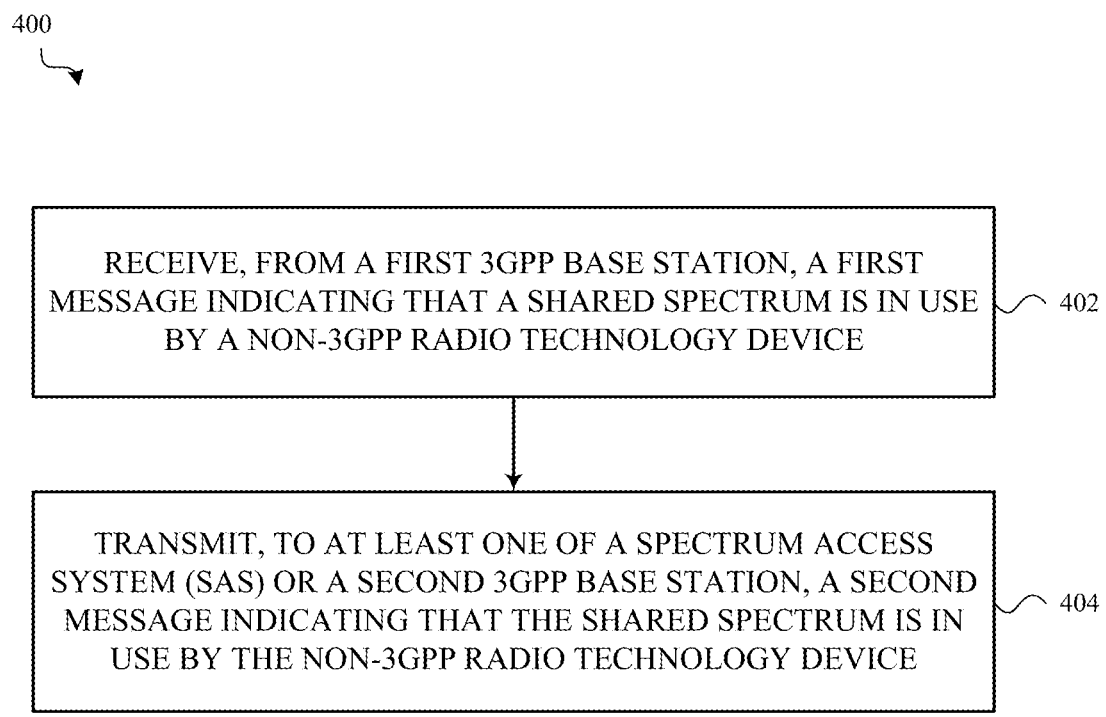
FIG. 4 shows an example method of communication by a network device within a core network of a 3GPP wireless communication system, which method may be used to indicate that a shared spectrum is in use by a non-3GPP radio technology device.

FIG. 4 shows an example method 400 of communication by a network device within a core network of a 3GPP wireless communication system, which method 400 may be used to indicate that a shared spectrum is in use by a non-3GPP radio technology device (e.g., a radar device). In some embodiments, the method 400 may be performed by a processor of the network device.

At block 402, the method 400 may include receiving, from a first 3GPP base station, a first message indicating that a shared spectrum is in use by a non-3GPP radio technology device. The first message may be received via a set of one or more network interfaces of the network device.

At block 404, the method 400 may include transmitting, via the set of one or more network interfaces and to at least one of an SAS or a second 3GPP base station, a message indicating that the shared spectrum is in use by the non-3GPP radio technology device. In some embodiments, the second message may include an indication to vacate use of the shared spectrum.

Embodiments contemplated herein include an apparatus having means to perform one or more elements of the method 200, 300, or 400. In the context of method 200, this apparatus may be, for example, an apparatus of a UE (such as a wireless device 102, 502, 602 that is a UE, as described herein). In the context of method 300, this apparatus may be, for example, an apparatus of a base station (such as a network device 104, 512, 618 that is a base station, as described herein). In the context of method 400, this apparatus may be, for example, an apparatus of a CN (such as a network device 106, 526, 624 of a CN (e.g., an AMF), as described herein).

Embodiments contemplated herein include one or more non-transitory computer-readable media storing instructions to cause an electronic device, upon execution of the instructions by one or more processors of the electronic device, to perform one or more elements of the method 200, 300, or 400. In the context of method 200, this non-transitory computer-readable media may be, for example, a memory of a UE (such as a memory 606 of a wireless device 602 that is a UE, as described herein). In the context of method 300, this non-transitory computer-readable media may be, for example, a memory of a base station (such as a memory of a network device 618 that is a base station, as described herein). In the context of method 400, this non-transitory computer-readable media may be, for example, a memory of a CN (such as a memory 628 of a network device 624 of a CN (e.g., an AMF), as described herein).

Embodiments contemplated herein include an apparatus having logic, modules, or circuitry to perform one or more elements of the method 200, 300, or 400. In the context of method 200, this apparatus may be, for example, an apparatus of a UE (such as a wireless device 602 that is a UE, as described herein). In the context of method 300, this apparatus may be, for example, an apparatus of a base station (such as a network device 618 that is a base station, as described herein). In the context of method 400, this apparatus may be, for example, an apparatus of a CN (such as a network device 624 of a CN (e.g., an AMF), as described herein).

Embodiments contemplated herein include an apparatus having one or more processors and one or more computer-readable media, using or storing instructions that, when executed by the one or more processors, cause the one or more processors to perform one or more elements of the method 200, 300, or 400. In the context of method 200, this apparatus may be, for example, an apparatus of a UE (such as a wireless device 602 that is a UE, as described herein). In the context of method 300, this apparatus may be, for example, an apparatus of a base station (such as a network device 618 that is a base station, as described herein). In the context of the method 400, this apparatus may be, for example, an apparatus of a CN (such as a network device 624 of a CN (e.g., an AMF), as described herein).

Embodiments contemplated herein include a signal as described in or related to one or more elements of the method 200, 300, or 400.

Embodiments contemplated herein include a computer program or computer program product having instructions, wherein execution of the program by a processor causes the processor to carry out one or more elements of the method 200, 300, or 400. In the context of method 200, the processor may be a processor of a UE (such as a processor(s) 604 of a wireless device 602 that is a UE, as described herein), and the instructions may be, for example, located in the processor and/or on a memory of the UE (such as a memory 606 of a wireless device 602 that is a UE, as described herein). In the context of method 300, the processor may be a processor of a base station (such as a processor(s) of a network device 618 that is a base station, as described herein), and the instructions may be, for example, located in the processor and/or on a memory of the base station (such as a memory of a network device 618 that is a base station, as described herein). In the context of method 400, the processor may be a processor of a CN (such as a processor(s) 626 of a network device 624 of a CN (e.g., an AMF), as described herein), and the instructions may be, for example, located in the processor and/or on a memory of the CN (such as a memory 628 of a network device 624 of a CN (e.g., an AMF), as described herein).

Figure 5:
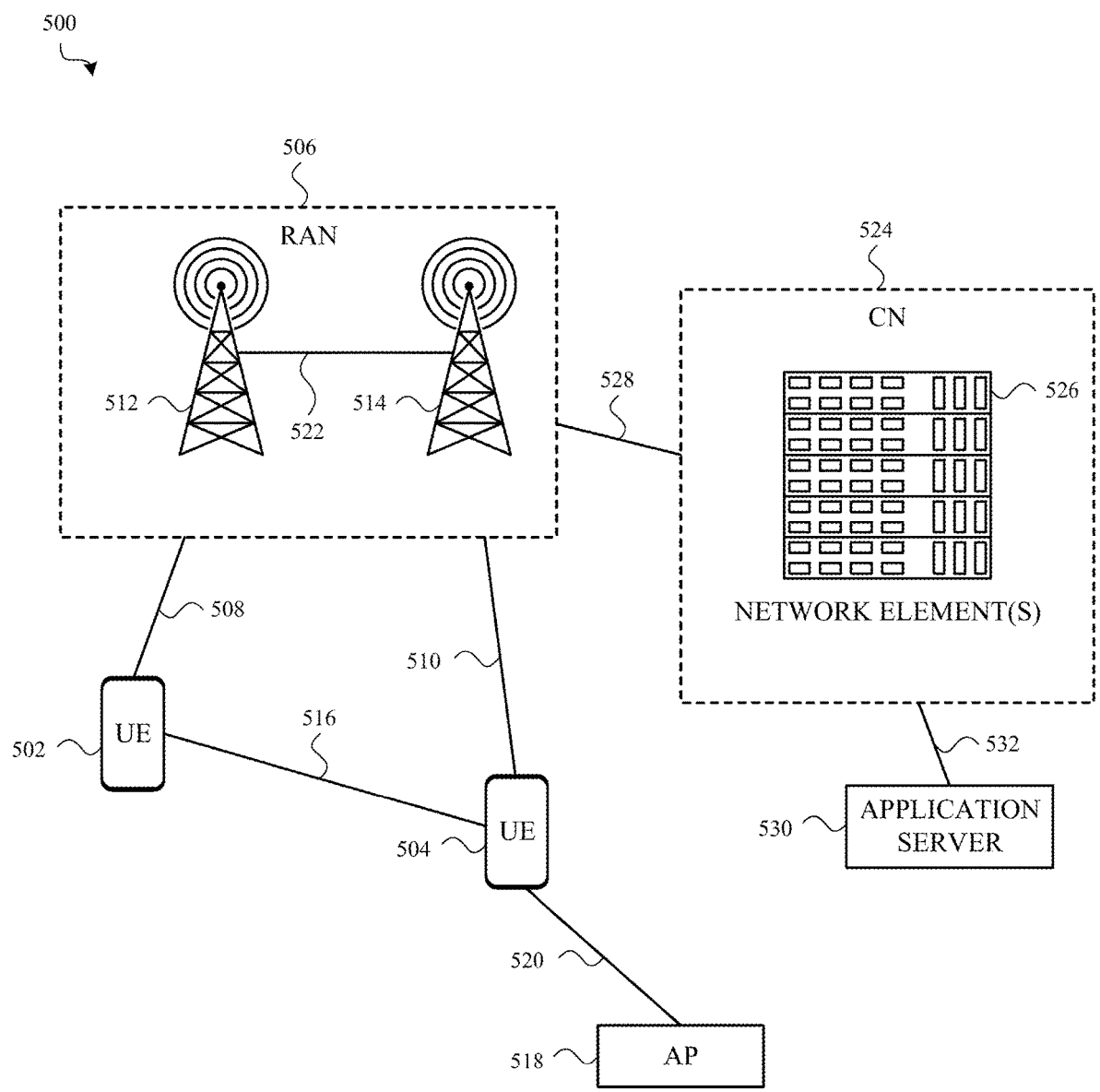
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the 4G or LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, including one or more AMFs, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and AMFs.

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
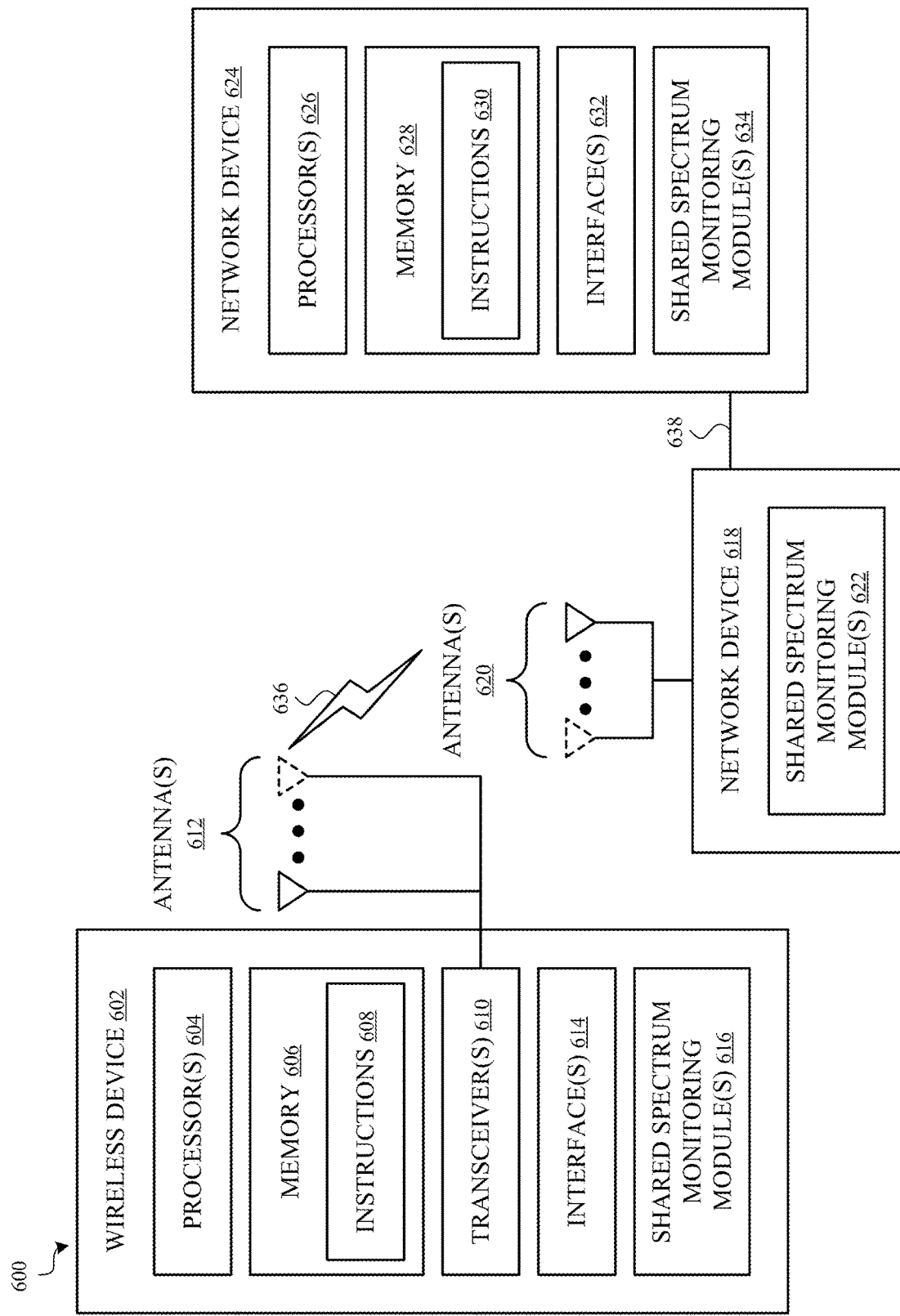
FIG. 6 illustrates a system for performing signaling between a wireless device and network devices, according to embodiments disclosed herein.

FIG. 6 illustrates a system 600 for performing signaling 636, 638 between a wireless device 602 and network devices 618, 624, according to embodiments disclosed herein. The system 600 may be a portion of a wireless communication system as herein described. The wireless device 602 may be, for example, a UE of a wireless communication system. The network devices 618, 624 may include, for example, a base station (e.g., a gNB) and an AMF of a wireless communication system (and in particular, a 3GPP wireless communication system).

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 636) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a shared spectrum monitoring module 616. The shared spectrum monitoring module 616 may be implemented via hardware, software, or a combination thereof. For example, the shared spectrum monitoring module 616 may be implemented as a processor, circuit, and/or instructions 608 stored in the memory 606 and executed by the processor(s) 604. In some examples, the shared spectrum monitoring module 616 may be integrated within the processor(s) 604 and/or the transceiver(s) 610. For example, the shared spectrum monitoring module 616 may be implemented by a combination of software components (e.g., executed by a DSP or a general processor) and hardware components (e.g., logic gates and circuitry) within the processor(s) 604 or the transceiver(s) 610.

The shared spectrum monitoring module 616 may be used for various aspects of the present disclosure, for example, aspects of FIG. 1 through FIG. 5. The shared spectrum monitoring module 616 may be configured to, for example, monitor at least one shared spectrum resource for use by non-3GPP radio technology devices, and communicate with a 3GPP base station, 3GPP CN, or other devices about shared spectrum monitoring and/or the results of shared spectrum monitoring. The shared spectrum monitoring module 616 may also be configured, for example, to receive and respond to a message indicating that the wireless device 602 should vacate shared spectrum (e.g., for a period of time).

The network device 618 may also include one or more processor(s). The processor(s) may execute instructions such that various operations of the network device 618 are performed, as described herein. The processor(s) may include one or more baseband processors implemented using, for example, a CPU, a DSP, an ASIC, a controller, an FPGA device, another hardware device, a firmware device, or any combination thereof configured to perform the operations described herein.

The network device 618 may include a memory. The memory may be a non-transitory computer-readable storage medium that stores instructions (which may include, for example, the instructions being executed by the processor(s)). The instructions may also be referred to as program code or a computer program. The memory may also store data used by, and results computed by, the processor(s).

The network device 618 may include one or more transceiver(s) that may include RF transmitter and/or receiver circuitry that use the antenna(s) 620 of the network device 618 to facilitate signaling (e.g., the signaling 636) to and/or from the network device 618 with other devices (e.g., the wireless device 602) according to corresponding RATs.

The network device 618 may include one or more antenna(s) 620 (e.g., one, two, four, or more). In embodiments having multiple antenna(s) 620, the network device 618 may perform MIMO, digital beamforming, analog beamforming, beam steering, etc., as has been described.

The network device 618 may include one or more interface(s). The interface(s) may be used to provide input to or output from the network device 618. For example, a network device 618 that is a base station may include interface(s) made up of transmitters, receivers, and other circuitry (e.g., other than the transceiver(s)/antenna(s) 620 already described) that enables the base station to communicate with other equipment (e.g., the network device 624) in a core network, and/or that enables the base station to communicate with external networks, computers, databases, and the like for purposes of operations, administration, and maintenance of the base station or other equipment operably connected thereto.

The network device 618 may include a shared spectrum monitoring module 622. The shared spectrum monitoring module 622 may be implemented via hardware, software, or a combination thereof. For example, the shared spectrum monitoring module 622 may be implemented as a processor, circuit, and/or instructions stored in the memory and executed by the processor(s). In some examples, the shared spectrum monitoring module 622 may be integrated within the processor(s) and/or the transceiver(s). For example, the shared spectrum monitoring module 622 may be implemented by a combination of software components (e.g., executed by a DSP or a general processor) and hardware components (e.g., logic gates and circuitry) within the processor(s) or the transceiver(s).

The shared spectrum monitoring module 622 may be used for various aspects of the present disclosure, for example, aspects of FIG. 1 through FIG. 5. The shared spectrum monitoring module 622 may be configured to, for example, monitor at least one shared spectrum resource for use by non-3GPP radio technology devices, and communicate with a neighbor 3GPP base station, a 3GPP CN, or other devices about shared spectrum monitoring and/or the results of shared spectrum monitoring. The shared spectrum monitoring module 622 may also be configured, for example, to receive and respond to a message indicating that the network device 618 should vacate shared spectrum (e.g., for a period of time), or to transmit messages to other devices indicating that the other devices should vacate shared spectrum.

The network device 624 may also include one or more processor(s) 626. The processor(s) 626 may execute instructions 630 such that various operations of the network device 624 are performed, as described herein. The processor(s) 626 may include one or more processors implemented using, for example, a CPU, a DSP, an ASIC, a controller, an FPGA device, another hardware device, a firmware device, or any combination thereof configured to perform the operations described herein.

The network device 624 may include a memory 628. The memory 628 may be a non-transitory computer-readable storage medium that stores instructions 630 (which may include, for example, the instructions being executed by the processor(s) 626). The instructions 630 may also be referred to as program code or a computer program. The memory 628 may also store data used by, and results computed by, the processor(s) 626.

The network device 624 may include one or more interface(s) 632. The interface(s) 632 may be used to provide input to or output from the network device 618. For example, a network device 624 that is an AMF of a core network may include interface(s) made up of transmitters, receivers, and other circuitry that enables the AMF to communicate with other equipment (e.g., the network device 618 via signaling 638, or the wireless device 602 via signaling 638 and the network device 618), and/or that enables the AMF to communicate with external networks, computers, databases, and the like for purposes of operations, administration, and maintenance of the AMF or other equipment operably connected thereto.

The network device 624 may include a shared spectrum monitoring module 634. The shared spectrum monitoring module 634 may be implemented via hardware, software, or a combination thereof. For example, the shared spectrum monitoring module 634 may be implemented as a processor, circuit, and/or instructions 630 stored in the memory 628 and executed by the processor(s) 626. In some examples, the shared spectrum monitoring module 634 may be integrated within the processor(s) 626. For example, the shared spectrum monitoring module 634 may be implemented by a combination of software components (e.g., executed by a DSP or a general processor) and hardware components (e.g., logic gates and circuitry) within the processor(s) 626.

The shared spectrum monitoring module 634 may be used for various aspects of the present disclosure, for example, aspects of FIG. 1 through FIG. 5. The shared spectrum monitoring module 634 may be configured to, for example, communicate with 3GPP base stations or other devices (an SAS) about shared spectrum monitoring and/or the results of shared spectrum monitoring. The shared spectrum monitoring module 622 may also be configured, for example, to receive and respond to a message indicating that the network device 624 should vacate shared spectrum (e.g., for a period of time), or to transmit messages to other devices indicating that the other devices should vacate shared spectrum.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A 3rd Generation Partnership Project (3GPP) apparatus comprising memory coupled to a processor, the processor configured to;
receive a measurement configuration including a measurement object and a reporting configuration, the measurement object identifying at least one shared spectrum resource;
monitor the at least one shared spectrum resource for use by non-3GPP radio technology devices;
identify a use of the at least one shared spectrum resource by a non-3GPP radio technology device;
determine a location of the 3GPP apparatus when the use of the at least one shared spectrum resource by the non-3GPP radio technology device is identified;
determine a granularity of location reporting; and
transmit, in accord with the reporting configuration, a report on the use of the at least one shared spectrum resource by the non-3GPP radio technology devices, the report on the use of the at least one shared spectrum resource transmitted with an indication of the location, the indication of the location based on the determined location and the granularity of location reporting.

2. The 3GPP apparatus of claim 1, wherein the processor is configured to monitor the at least one shared spectrum resource by measuring an energy received on the at least one shared spectrum resource.

3. The 3GPP apparatus of claim 1, wherein the processor is configured to monitor the at least one shared spectrum resource by monitoring the at least one shared spectrum resource for a radar signal.

4. The 3GPP apparatus of claim 1, wherein:
the processor is configured to,
determine a radar type using the at least one shared spectrum resource; and
transmit, in the report on the use of the at least one shared spectrum resource, an indication of the determined radar type.

5. The 3GPP apparatus of claim 1, wherein the report is transmitted as a periodic report.

6. The 3GPP apparatus of claim 1, wherein:
the processor is configured to determine whether a trigger event is met; and
the processor is configured to transmit the report after the trigger event is met.

7. The 3GPP apparatus of claim 1, wherein the processor is configured to transmit, via the wireless transceiver, a UE capability to participate in shared spectrum monitoring.

8. The 3GPP apparatus of claim 1, wherein the processor is configured to transmit UE assistance information indicating at least one of:
an indication of whether the 3GPP apparatus prefers not to participate in shared spectrum monitoring for a period of time;
a preferred reporting mode for reporting use of shared spectrum; or
a preferred periodicity for reporting the use of the shared spectrum.

9. The 3GPP apparatus of claim 1, wherein:
the shared spectrum resource is a Citizens Broadband Radio Service (CBRS) resource; and
the non-3GPP radio technology devices include a radar device.

10. An apparatus of a 3rd Generation Partnership Project (3GPP) radio access network (RAN) comprising memory coupled to a process, the
processor configured to:
receive, from a 3GPP user equipment (UE), a report on the use of a shared spectrum resource by a non-3GPP radio technology device;
determine, based at least in part on the report, that the shared spectrum resource is in use by the non-3GPP radio technology device;
in response to determining that the shared spectrum resource is in use by the non-3GPP radio technology device, vacate use of a shared spectrum including the shared spectrum resource; and
in response to determining the shared spectrum resource is in use by the non-3GPP radio technology device, transmit a message indicating that the shared spectrum is in use by the non-3GPP radio technology device to at least one of a spectrum access system (SAS), a 3GPP core network, or a neighbor 3GPP network device of a RAN.

11. The 3GPP network device apparatus of claim 10, wherein: the processor is configured to determine the 3GPP UE or a user of the 3GPP UE has consented to participate in shared spectrum monitoring; and configure the 3GPP UE to transmit the report on the use of the shared spectrum resource in response to determining the 3GPP UE or the user has consented to participate in the shared spectrum monitoring.

12. The 3GPP network device apparatus of claim 10, wherein: the processor is configured to, determine the 3GPP UE or a user of the 3GPP UE has not consented to participate in shared spectrum monitoring or has provided only limited consent to participate in shared spectrum monitoring; and configure the 3GPP UE to either, withhold an indication of a location of the 3GPP UE from the report; or transmit a coarse location of the 3GPP UE with the report, the coarse location being less granular than a determined location of the 3GPP UE.

13. The apparatus of claim 10, wherein the message includes at least one of:
a frequency used by the non-3GPP radio technology device;
a binary use indication;
a type of use by the non-3GPP radio technology device; or
a measurement of at least one shared spectrum resource.

14. The apparatus claim 10, wherein:
the shared spectrum resource is a Citizens Broadband Radio Service (CBRS) resource; and
the non-3GPP radio technology device is a radar device.

15. A 3rd Generation Partnership Project (3GPP) apparatus comprising memory coupled to a processor, the processor configured to:
receive a measurement configuration including a measurement object and a reporting configuration, the measurement object identifying at least one shared spectrum resource;
monitor the at least one shared spectrum resource for use by non-3GPP radio technology devices;
identify a use of the at least one shared spectrum resource by a non-3GPP radio technology device;
determine a location of the 3GPP UE when the use of the at least one shared spectrum resource by the non-3GPP radio technology device is identified;
determine whether the location differs from a prior location of the 3GPP UE by more than a threshold amount;
transmit the report with an indication of the location when the location differs from the prior location by more than the threshold amount and otherwise not transmit the indication of the location with the report; and
transmit, in accord with the reporting configuration, a report on the use of the at least one shared spectrum resource by the non-3GPP radio technology devices.

16. The 3GPP apparatus of claim 15, wherein the processor is configured to monitor the at least one shared spectrum resource by monitoring the at least one shared spectrum resource for a radar signal.

17. The 3GPP apparatus of claim 15, wherein:
the processor is configured to,
determine a radar type using the at least one shared spectrum resource; and
transmit, in the report on the use of the at least one shared spectrum resource, an indication of the determined radar type.

18. The 3GPP apparatus of claim 15, wherein:
the processor is configured to determine whether a trigger event is met; and
the processor is configured to transmit the report after the trigger event is met.

19. The 3GPP apparatus of claim 15, wherein the processor is configured to transmit a UE capability to participate in shared spectrum monitoring.

20. The 3GPP apparatus of claim 15, wherein the processor is configured to transmit UE assistance information indicating at least one of:
an indication of whether the 3GPP apparatus prefers not to participate in shared spectrum monitoring for a period of time;
a preferred reporting mode for reporting use of shared spectrum; or
a preferred periodicity for reporting the use of the shared spectrum.

* * * * *